(12) United States Patent
Gallagher et al.

(10) Patent No.: US 7,574,054 B2
(45) Date of Patent: Aug. 11, 2009

(54) USING PHOTOGRAPHER IDENTITY TO CLASSIFY IMAGES

(75) Inventors: Andrew C. Gallagher, Brockport, NY (US); John A. Weldy, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 12/258,387

(22) Filed: Oct. 25, 2008

(65) Prior Publication Data

US 2009/0046933 A1      Feb. 19, 2009

Related U.S. Application Data

(62) Division of application No. 11/143,541, filed on Jun. 2, 2005, now abandoned.

(51) Int. Cl.
    *G06K 9/62* (2006.01)
(52) U.S. Cl. .................. 382/228; 382/115; 382/155; 382/159; 382/173; 382/181; 382/224; 382/226; 382/227
(58) Field of Classification Search .................. 382/115, 382/116, 118, 155, 159, 173, 180, 181, 224, 382/226, 227, 228
    See application file for complete search history.

(56) References Cited

U.S. PATENT DOCUMENTS 6,433,818 B1    8/2002   Steinberg et al.
6,591,005 B1    7/2003   Gallagher
2002/0080256 A1   6/2002   Bates et al.
2002/0140843 A1  10/2002   Tretter et al.
2003/0152289 A1   8/2003   Luo
2003/0235411 A1  12/2003   Morikawa et al.
2004/0170323 A1   9/2004   Cootes et al.
2004/0174434 A1   9/2004   Walker et al.

FOREIGN PATENT DOCUMENTS

EP       1418509        5/2004

OTHER PUBLICATIONS

Davis et al., From Context to Content: Leveraging Context for Mobile Media Metadata, 2004, Proc. of 12th Int. Conf. on Mobile System, Applications, and Services, pp. 1-7.*
"Eigenfaces for Recognition" by Matthew Turk and Alex Pentland, Journal of Cognitive Neuroscience vol. 3, No. 1, pp. 71-86.

(Continued)

*Primary Examiner*—Vikkram Bali
*Assistant Examiner*—Daniel Zeilberger
(74) *Attorney, Agent, or Firm*—Raymond L. Owens (57) ABSTRACT

A method of identifying at least one particular person of interest in a collection of digital images taken over time, includes providing the collection of digital images with each digital image containing one or more persons; storing in a digital database an appearance model having a set of features associated with the particular person of interest and a prior probability of the person of interest appearing in images by a particular photographer; and comparing the appearance model with features extracted from the digital images in the collection of digital images and using the prior probability and the appearance model to determine if the particular person of interest is in one or more digital images in the collection of digital images.

5 Claims, 6 Drawing Sheets

OTHER PUBLICATIONS

"Constrained Active Appearance Models" by T. F. Cootes et al. 8th International Conference on Computer Vision, vol. 1, pp. 748-754, IEEE Computer Society Press, Jul. 2001.

"Feature Extraction from Faces Using Deformable Templates" by Alan L. Yuille et al., Int. Journal of Comp. Vis., vol. 8, Iss, 2, 1992, pp. 99-111.

"Fast Multi-view Face Detection" by Michael Jones et al., IEEE Conference on Computer Vision and Pattern Recognition (CVPR), Jun. 2003.

Davis et al, From Context to Content: Leveraging Contest to Infer Media Metadata, Proc. ACM Int. Conf. on Multimedia, Oct. 10, 2004, pp. 188-195.

Boutell et al, Bayesian fusion of camera metadata cues in semantic scene classification, Proceedings of the 2004 IEEE Computer Society Conference on Computer Vision and Recognition, Jun. 2004, pp. 1-8.

Lei et al, Automated annotation of human faces in family albums, Proceedings of the 11th ACM International Conf. on Multimedia, Nov. 2003, pp. 355-358.

Longbin et al, Face annotation for family photo management, Inter. Journal of Image and Graphics, World Scientific Publishing Co., Dec. 2002, pp. abstract, 1-4.

* cited by examiner

USING PHOTOGRAPHER IDENTITY TO CLASSIFY IMAGES

CROSS REFERENCE TO RELATED APPLICATIONS

This application is a divisional of commonly-assigned U.S. patent application Ser. No. 11/143,541 filed Jun. 2, 2005 now abandoned. Reference is made to commonly assigned, co-pending U.S. patent application Ser. No. 11/116,729 filed Apr. 28, 2005, entitled "Using Time in Recognizing Persons in Images" by Gallagher et al, the disclosure of which is incorporated herein by reference.

FIELD OF THE INVENTION

The invention relates to image processing and more particularly relates to the identification or recognition of a person of interest in a collection of digital images or videos.

BACKGROUND OF THE INVENTION

With the advent of digital photography, consumers are amassing large collections of digital images and videos. The average number of images captures with digital cameras per photographer is still increasing each year. As a consequence, the organization and retrieval of images and videos is already a problem for the typical consumer. Currently, the length of time spanned by a typical consumer's digital image collection is only a few years. The organization and retrieval problem and its complexity will continue to grow as the length of time spanned by the average digital image and video collection increases and the sources for image content also increases.

Descriptors of a photographer, such as biometric data, can be detected and/or recorded in an image capture device such as a digital camera.

US Patent Application Publication US 2003/235411A1 discloses an imaging apparatus wherein a biological recording means records biological information of a photographer and subsequently uses this information to control the imaging apparatus.

U.S. Pat. No. 6,433,818 describes a camera with built-in apparatus for acquiring measured biometric data of a potential user, comparing it with corresponding biometric signature data entered in the camera, and allowing camera operation only if there is a match. This function provides security and prevents unauthorized access to the data stored on the camera, thereby discouraging theft.

U.S. Patent Application Publication US 2002/0080256A1 describes a digital camera with built-in apparatus for biometric identification of the photographer and for recording the identification of the photographer of an image. Furthermore, this feature can be used to discourage theft or piracy of the camera. Preferably, an image of the photographer's Iris is captured to determine the identity of the photographer.

One of the most prevalent image content subjects of photography is people. Furthermore, in a given collection of digital images and videos, certain people tend to occur frequently. For example, it is common for most images captured by new parents to contain their new baby. Consumers desire the ability to find all images from their collection containing a specific person.

SUMMARY OF THE INVENTION

It is an object of the present invention to make use of the fact that a particular photographer has captured the images in a collection to find objects of interest in the collection.

This object is achieved by a method of identifying at least one particular person of interest in a collection of digital images taken over time, comprising:

providing the collection of digital images with each digital image containing one or more persons;

storing in a digital database an appearance model having a set of features associated with the particular person of interest and a prior probability of the person of interest appearing in images by a particular photographer; and comparing the appearance model with features extracted from the digital images in the collection of digital images and using the prior probability and the appearance model to determine if the particular person of interest is in one or more digital images in the collection of digital images.

It is an advantage of the present invention that when a known photographer has taken images in a collection, that fact can be used to find images of interest. This is made possible because the likelihood that an object of interest appears in an image is related to the identity of the photographer.

It is a further advantage of the invention that knowledge of the identity of the particular photographer of an image can be used in determining the orientation of the captured image and whether the image was captured indoors or outdoors.

BRIEF DESCRIPTION OF THE DRAWINGS

The above-mentioned and other features and objects of this invention and the manner of attaining them will become more apparent and the invention itself will be better understood by reference to the following description of an embodiment of the invention taken in conjunction with the accompanying figures wherein.

DETAILED DESCRIPTION OF THE INVENTION

In the following description, some embodiments of the present invention will be described as software programs and/or algorithmic flow diagrams. Those skilled in the art will readily recognize that the equivalent of such software can also be constructed in hardware. Because image manipulation algorithms and systems are well known, the present description will be directed in particular to algorithms and systems forming part of, or cooperating more directly with, the method in accordance with the present invention. Other aspects of such algorithms and systems, and hardware and/or software for producing and otherwise processing the image signals involved therewith, not specifically shown or described herein can be selected from such systems, algorithms, components, and elements known in the art. Given the description as set forth in the following specification, all software implementation thereof is conventional and within the ordinary skill in such arts.

Figure 1:
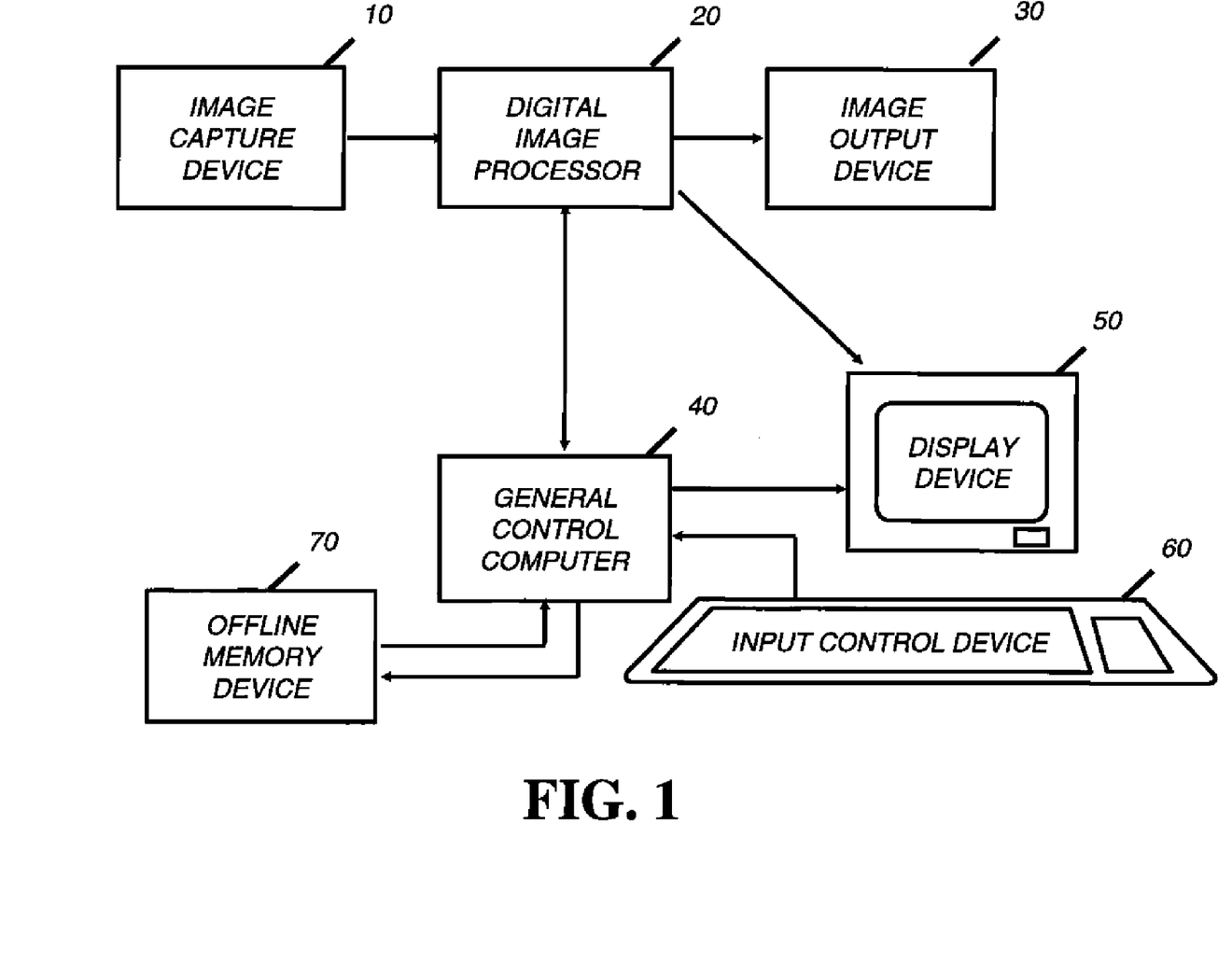
FIG. 1 is a schematic diagram of computer system that can implement the present invention.

The present invention can be implemented in computer hardware and computerized equipment. For example, the method can be performed in a digital camera or other digital image capture devices, a digital printer, on an internet server, on a kiosk, and on a personal computer. Referring to FIG. 1, there is illustrated a computer system for implementing the present invention. Although the computer system is shown for the purpose of illustrating a preferred embodiment, the present invention is not limited to the computer system shown, but can be used on any electronic processing system such as found in digital cameras, cell phones, portable computing devices, home computers, kiosks, retail or wholesale photofinishing, or any other system for the processing of digital images. The computer system includes a microprocessor-based unit 20 (also referred to herein as a digital image processor) for receiving and processing software programs and for performing other processing functions. The digital image processor 20 processes images from image capture devices 10 such as cameras, scanners, or computer image generation software. The digital image processor 20 can be used to process digital images to make adjustments for overall brightness, tone scale, image structure, etc. of digital images in a manner such that a pleasing looking image is produced by an image output device. The digital image processor 20 interfaces with the general control computer 40 (also a microprocessor based unit) for exchanging data and commands. The general control computer 40 and the digital image processor 20 can be two different microprocessors, or the functions of each can be performs by a single physical microprocessor. The digital image processor 20 often outputs an image to an image output device 30 for example a printer for displaying the image. A display device 50 is electrically connected to the digital image processor 20 for displaying user-related information associated with the software, e.g., by means of a graphical user interface. A keyboard 60 is also connected to the microprocessor based unit 20 via the general control computer 40 for permitting a user to input information to the software. As an alternative to using the keyboard 60 for input, a mouse can be used for moving a selector on the display device 50 and for selecting an item on which the selector overlays, as is well known in the art.

A compact disk-read only memory (CD-ROM) which typically includes software programs, is inserted into the general control computer 40 for providing a means of inputting the software programs and other information to the general control computer 40 and the digital image processor 20. In addition, a floppy disk can also include a software program, and is inserted into the general control computer 40 for inputting the software program. Still further, the general control computer 40 can be programmed, as is well known in the art, for storing the software program internally. The general control computer 40 can have a network connection, such as a telephone line or wireless connection, to an external network, such as a local area network or the Internet.

Images can also be displayed on the display device 50 via a personal computer card (PC Card), such as, as it was formerly known, a PCMCIA card (based on the specifications of the Personal Computer Memory Card International Association) which contains digitized images electronically embodied in the card.

The image output device 30 provides a final image. The output device 30 can be a printer or other output device that provides a paper or other hard copy final image. The output device 30 can also be an output device that provides the final image as a digital file. The output device 30 can also include combinations of output, such as a printed image and a digital file on a memory unit, such as a CD or DVD. Digital images and other data are stored on an offline memory device 70 such as an external hard drive, flash media, a drive that writes to CD-ROM or DVD media, or the like.

A digital image includes one or more digital image channels or color components. Each digital image channel is a two-dimensional array of pixels. Each pixel value relates to the amount of light received by the imaging capture device corresponding to the physical region of pixel. For color imaging applications, a digital image will often consist of red, green, and blue digital image channels. Motion imaging applications can be thought of as a sequence of digital images. Those skilled in the art will recognize that the present invention can be applied to, but is not limited to, a digital image channel for any of the herein-mentioned applications. Although a digital image channel is described as a two dimensional array of pixel values arranged by rows and columns, those skilled in the art will recognize that the present invention can be applied to non rectilinear arrays with equal effect. Those skilled in the art will also recognize that for digital image processing steps described hereinbelow as replacing original pixel values with processed pixel values is functionally equivalent to describing the same processing steps as generating a new digital image with the processed pixel values while retaining the original pixel values.

It should also be noted that the present invention can be implemented in a combination of software and/or hardware and is not limited to devices which are physically connected and/or located within the same physical location. One or more of the devices illustrated in FIG. 1 can be located remotely and can be connected via a network. One or more of the devices can be connected wirelessly, such as by a radio-frequency link, either directly or via a network.

The present invention can be employed in a variety of user contexts and environments. Exemplary contexts and environments include, without limitation, wholesale digital photofinishing (which involves exemplary process steps or stages such as film in, digital processing, prints out), retail digital photofinishing (film in, digital processing, prints out), home printing (home scanned film or digital images, digital processing, prints out), desktop software (software that applies algorithms to digital prints to make them better—or even just to change them), digital fulfillment (digital images in—from media or over the web, digital processing, with images out—in digital form on media, digital form over the web, or printed on hard-copy prints), kiosks (digital or scanned input, digital processing, digital or hard copy output), mobile devices (e.g., PDA or cell phone that can be used as a processing unit, a display unit, or a unit to give processing instructions), and as a service offered via the World Wide Web.

In each case, the invention can stand alone or can be a component of a larger system solution. Furthermore, human interfaces, e.g., the scanning or input, the digital processing, the display to a user (if needed), the input of user requests or processing instructions (if needed), the output, can each be on the same or different devices and physical locations, and communication between the devices and locations can be via public or private network connections, or media based communication. Where consistent with the foregoing disclosure of the present invention, the method of the invention can be fully automatic, can have user input (be fully or partially manual), can have user or operator review to accept/reject the result, or can be assisted by metadata (metadata that can be user supplied, supplied by a measuring device (e.g. in a camera), or determined by an algorithm). Moreover, the algorithm(s) can interface with a variety of workflow user interface schemes.

The invention is inclusive of combinations of the embodiments described herein. References to "a particular embodiment" and the like refer to features that are present in at least one embodiment of the invention. Separate references to "an embodiment" or "particular embodiments" or the like do not necessarily refer to the same embodiment or embodiments; however, such embodiments are not mutually exclusive, unless so indicated or as are readily apparent to one of skill in the art.

Figure 2:
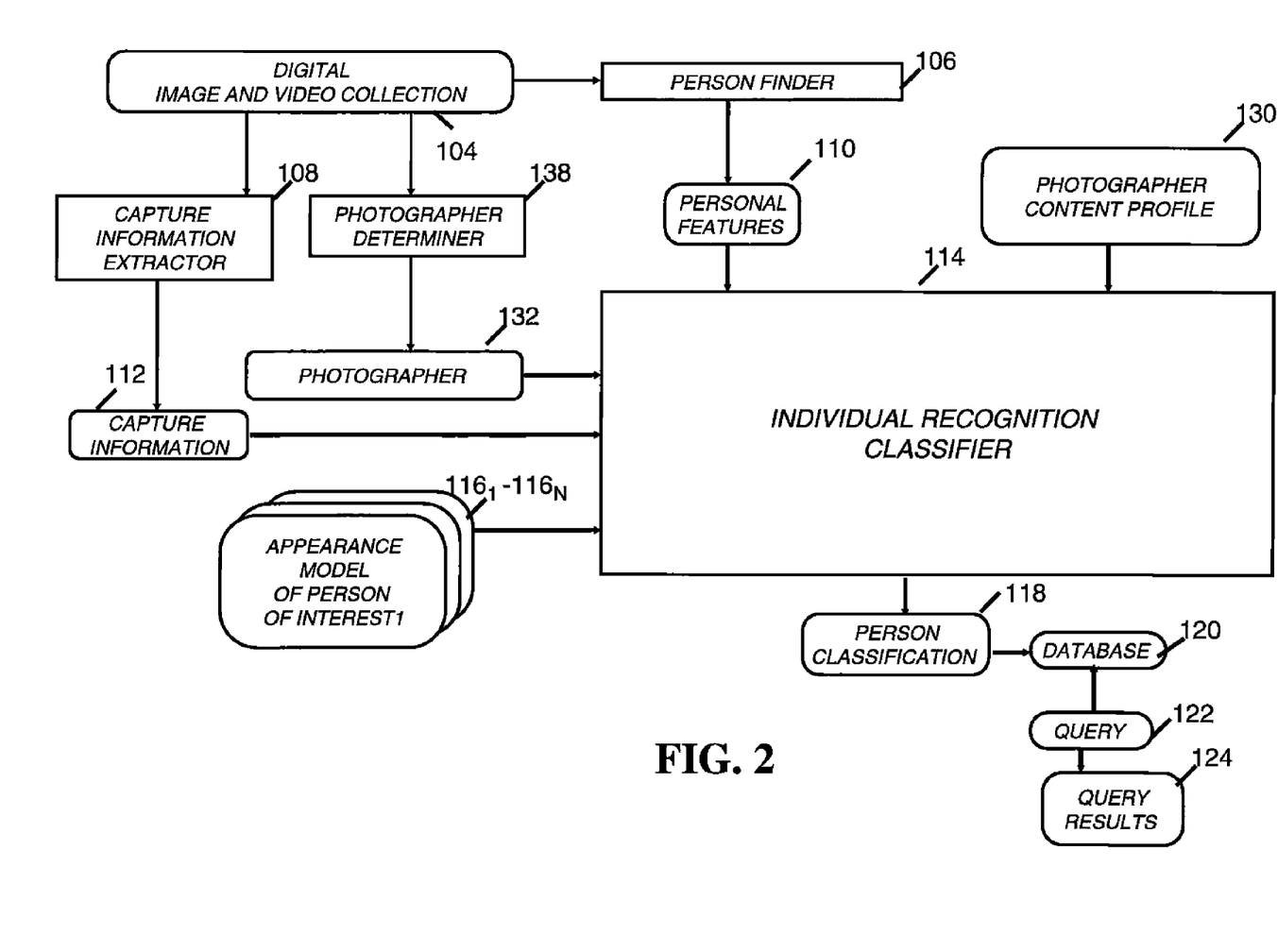
FIG. 2 is a flow chart of an embodiment of the present invention.

A first embodiment of this method is illustrated in FIG. 2. A digital image and video collection 104 is analyzed to recognize the identities of the people therein. Recognition of the people in a collection of the digital images or videos 104 allows for the creation of a database 120 relating digital images or videos 104 and the identities of the people in the digital images or videos 104. Consequently, the database 120 can be queried 122 to find those images and videos containing the query person of interest. The database 120 can be in any form. The database 120 can be distributed across many files, by for example, inserting a person classification 118 into the file header of the digital image or video 104. For example, a query 122 for images of "Jim" returns query results 124 containing the set of digital images or videos 104 containing the person of interest "Jim". Then the query results 124 can be returned. The query results 124 are the set of digital images and videos 104 containing the query person of interest. The digital images and videos 104 of the query result 124 can be displayed on a display device 50 as shown in FIG. 1 for review by the user.

In the system, the digital image or video 104 is passed to the capture information extractor 108. The capture information extractor 108 determines the capture information 112 related to the capture of the digital image and videos 104 of the collection, and outputs the resulting information, where capture information 112 related to a particular digital image or video 104 is associated with that particular digital image or video 104. The capture information 112 can be the time a particular digital image or video 104 was captured, the location the image or video was captured, the focal length, the subject distance, the number of rows and columns of pixels, the magnification, whether the flash was fired, whether the self-timer was activated, etc. The capture information 112 for a particular image or video is determined by one of several methods by the capture information extractor 108. Often times, capture information 112 is embedded in the file header of the digital image or video 104. For example, the EXIF image format (described at www.exif.org) allows the image or video capture device to store information associated with the image or video in the file header. The "Date\Time" entry is associated with the date and time the image was captured. In some cases, the digital image or video results from scanning film and the image capture time is determined by detection of the date printed into the image (as is often done at capture time) area, usually in the lower left corner of the image. The date a photograph is printed is often printed on the back of the print. Alternatively, some film systems contain a magnetic layer in the film for storing information such as the capture date. The capture information extractor 108 uses the most appropriate method for extracting the capture information 112 of the image. Preferably, the source of the digital images and videos is a digital camera, and the capture information extractor 108 extracts the capture information from the image file information.

The images and videos of the collection are also analyzed by the photographer determiner 138 to determine the identity of the particular photographer for each image and video. When the EXIF file format is used, the identity of the photographer can be stored in the "Camera Owner", "Image Creator", "Photographer", or "Copyright" tags for example. The identity of the photographer of an image or video can be entered manually before, during, or after capturing the video. Furthermore, several cameras (e.g. in U.S. Patent Application Publication US 2002/0080256A1) have been described that contain means for extracting biometric information from the photographer, identifying the photographer, and then annotating the image with the identity of the photographer. In any case, the photographer determiner 138 discovers the identity of the photographer 132 and passes that information to the individual recognition classifier 114. In some cases, the photographer 132 can not be able to be identified by the photographer determiner 138. In this case, the photographer 132 is "unknown". For example, this situation can occur when a person who owns the camera is on vacation and asks a stranger to use her (the vacationing camera owner) camera to capture an image of her in front of a landmark. A camera such as described in U.S. Patent Application US 2002/0080256A1 can only feasibly identify the photographer from a small set of potential camera users (e.g. the primary user is probably the camera owner, and secondary users are friends and family of the camera owner) whose profiles are known by the camera. In this case, an image captured by a stranger using the camera would simply be identified by the photographer determiner 138 as having an "unknown" photographer 132.

Image capture time can be included in the capture information 112 and can be a precise minute in time, e.g. Mar. 27, 2004 at 10:17 AM. Or the image capture time can be less precise, e.g. 2004 or March 2004. The image capture time can be in the form of a probability distribution function e.g. Mar. 27, 2004 +/−2 days with 95% confidence. The image capture time is input to the individual recognition classifier 114.

The person finder 106 identifies one or more persons in the digital video or digital image. Preferably, people are found by face detection. Methods for detecting human faces are well known in the art of digital image processing. For example, a face detection method for finding human faces in images is described in the following article: Jones, M. J.; Viola, P., "Fast Multi-view Face Detection", *IEEE Conference on Computer Vision and Pattern Recognition (CVPR)*, June 2003. Furthermore, once a face is detected, the facial features (e.g. eyes, nose, mouth, etc.) can also be localized using well known methods such as described by Yuille et al. in, "Feature Extraction from Faces Using Deformable Templates," *Int. Journal of Comp. Vis., Vol.* 8, Iss. 2, 1992, pp. 99-111. The authors describe a method of using energy minimization with template matching for locating the mouth, eye and iris/sclera boundary. Facial features can also be found using active appearance models as described by T. F. Cootes and C. J. Taylor "Constrained active appearance models", 8*th International Conference on Computer Vision*, volume 1, pages 748-754. IEEE Computer Society Press, July 2001.

Alternatively, different facial features can also be used. For example, an embodiment can be based upon the facial similarity metric described by M. Turk and A. Pentland in "Eigenfaces for Recognition" *Journal of Cognitive Neuroscience.* Vol 3, No. 1. 71-86, 1991. Facial descriptors are obtained by projecting the image of a face onto a set of principal component functions that describe the variability of facial appearance. The similarity between any two faces is measured by computing the Euclidean distance of the features obtained by projecting each face onto the same set of functions. In this case, an appearance model can describe the mean and covariance of the projection of multiple images of the same face onto these principal component functions. The similarity metric (for example computed by comparer 140 of FIG. 4) can calculate the Mahalonobis of a new face to the mean of the model.

The appearance model and similarity measurement could include a combination of several disparate feature types such as Eigenfaces, facial measurements, color/texture information, wavelet features etc.

Figure 3A:
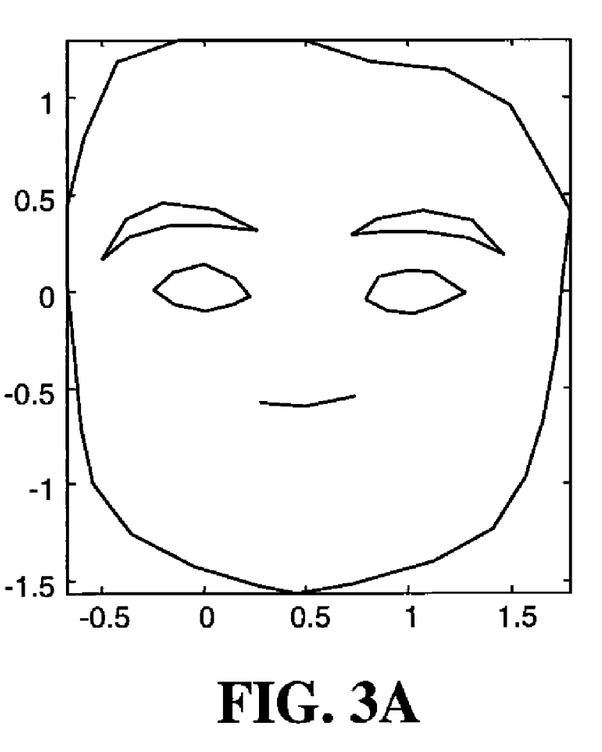
FIGS. 3A and 3B are appearance models of a person of interest having different associated times.
Figure 3B:
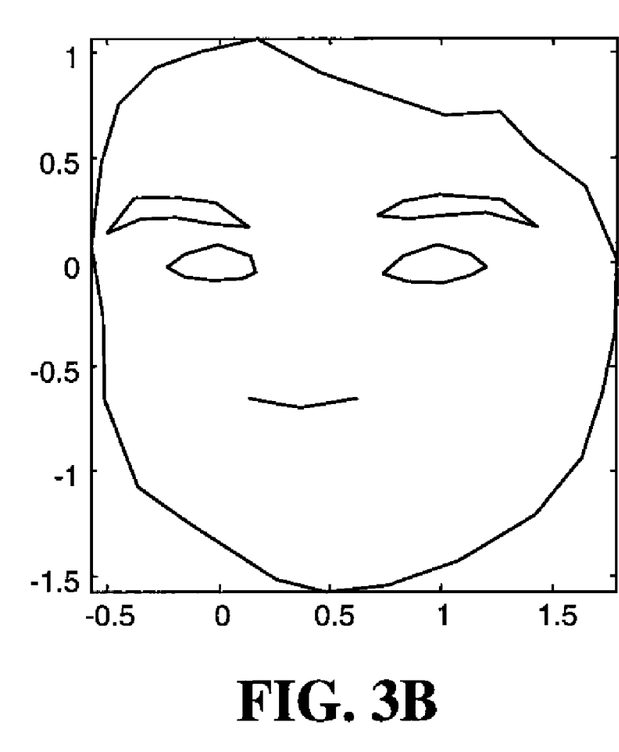

A person finder 106 outputs personal features 110 that are quantitative descriptions of a person detected by the person detector 106. Preferably, the person finder 106 outputs one set of personal features 110 for each detected person. Preferably the personal features are the locations of 82 feature points associated with specific facial features, found using a method similar to the aforementioned active appearance model of Cootes et al. A visual representation of the facial feature points for an image of a face is shown in FIG. 3A and FIG. 3B as an illustration. Alternatively, the personal features 110 can additionally be represented with quantifiable descriptors such as eye color, skin color, face shape, etc. The personal features 110 can also be distances between specific feature points or angles formed by lines connecting sets of specific feature points. Color cues are easily extracted from the digital image or video 104 once the person and facial features are located by the person finder 106. The personal features 110 are input to the individual recognition classifier 114.

A set of appearance models $116_1$-$116_M$ of M persons of interest from a stored digital database is input to the individual recognition classifier 114 for determining the identity of each of the persons detected by the person finder 106 and represented by the personal features 110. The appearance models $116_1$-$116_M$ contain a set of features associated with a particular person of interest. Each appearance model for an individual of interest can include a number of sub-models, for example models describing the appearance of the person of interest at different ages as described in above-cited co-pending application U.S. patent application Ser. No. 11/116,729. Or the sub-models could describe the appearance of the person of interest with different appearances (e.g. one sub-model represents the appearance of the person of interest with facial hair, another sub-model represents the appearance of the person of interest without facial hair). The appearance model will be discussed in greater detail hereinbelow. A person of interest is a person that is important to identify in a collection of digital images and videos 104. For example, in a household with small children, each child would likely be a person of interest because it would be useful and valuable for a head of the household to identify occurrences of each child in each photo and video 104 of the digital media collection. The aforementioned camera owner, as primary photographer, can be a person of interest as can be any secondary photographers (i.e. friends and family of the camera owner). The purpose of the individual recognition classifier 114 is to use one or more of the appearance models $116_1$-$116_M$, the image capture information 112, and the personal features 110 to determine if a person detected by the person finder 106 is a particular person of interest. This is accomplished by comparing the personal features 110 of the detected person with the features of the appearance model 116 of the particular person of interest. The individual recognition classifier 114 outputs the person classification 118. Typically, the individual recognition classifier outputs a high probability that a person detected by the person finder 106 is a particular person of interest m when the personal features 110 associated with the detected person are similar to the appearance model 116m associated with the particular person of interest m. Preferably, the person classification 118 is the likelihood (probability) that the person detected by the person finder 106 is the person of interest. The person classification 118 can be a binary indicator (e.g. true of false) indicating the classifier's decision on whether the person associated with the personal features 110 is the person of interest.

By repeating the application of the individual recognition classifier 114 to each person detected in each digital image or video 104 of a collection, all persons detected by the person finder 106 are classified as to the likelihood that each is the particular person of interest.

The person classification 118 can then be associated with digital image or video containing the detected person. For example, an image can be tagged or annotated in the database 120 as containing the person of interest "Mary". Furthermore, the person classification 118 information can be associated with the personal features 110. Furthermore, the image can also be tagged with the location within the digital image or video of the person detected by the person finder 106 that the individual recognition classifier 114 determined was the person of interest. Furthermore, the likelihood or probability of the person classification 118 can be added to the annotation in the database 120 as well. When the query 122 is made for digital images or videos 104 containing a particular person of interest, the database 120 is searched and the appropriate query results 124 are returned to the user on a user interface such as the display device 50 of FIG. 1.

The individual recognition classifier uses the photographer 132 information as follows: When the image capture information 112 indicates that the camera's self-timer was used to capture a particular image or video, then the individual recognition classifier 114 outputs the person classification 118 indicating a high likelihood (probability) that the digital image or video 104 contains the photographer 132. For example, the probability is in the range of 0.75 to 1.0, depending on the particular photographer 132. This results from the fact that most times, the camera self-timer is used to allow time for the photographer 132 to activate the camera then run to be included in the scene captured by the camera in the particular digital image or video 104.

Likewise, when the image capture information 112 indicates that the camera's image or video capture was activated via remote control, then the individual recognition classifier 114 outputs a person classification 118 indicating a medium likelihood (probability) that the digital image or video 104 contains the photographer 132. This results from the fact that often times, the camera's image or video capture is activated using remote control to allow time the photographer 132 to be in the scene captured by the camera in the particular digital image or video 104. However, remote activation of the camera's capture sequence can also be used to avoid shaking the camera. For this reason, the probability associated with the person classification 118 indicating that the photographer 132 is in the digital image or video 104 is in the range of 0.5 to 0.9, depending on the particular photographer 132.

Figure 4:
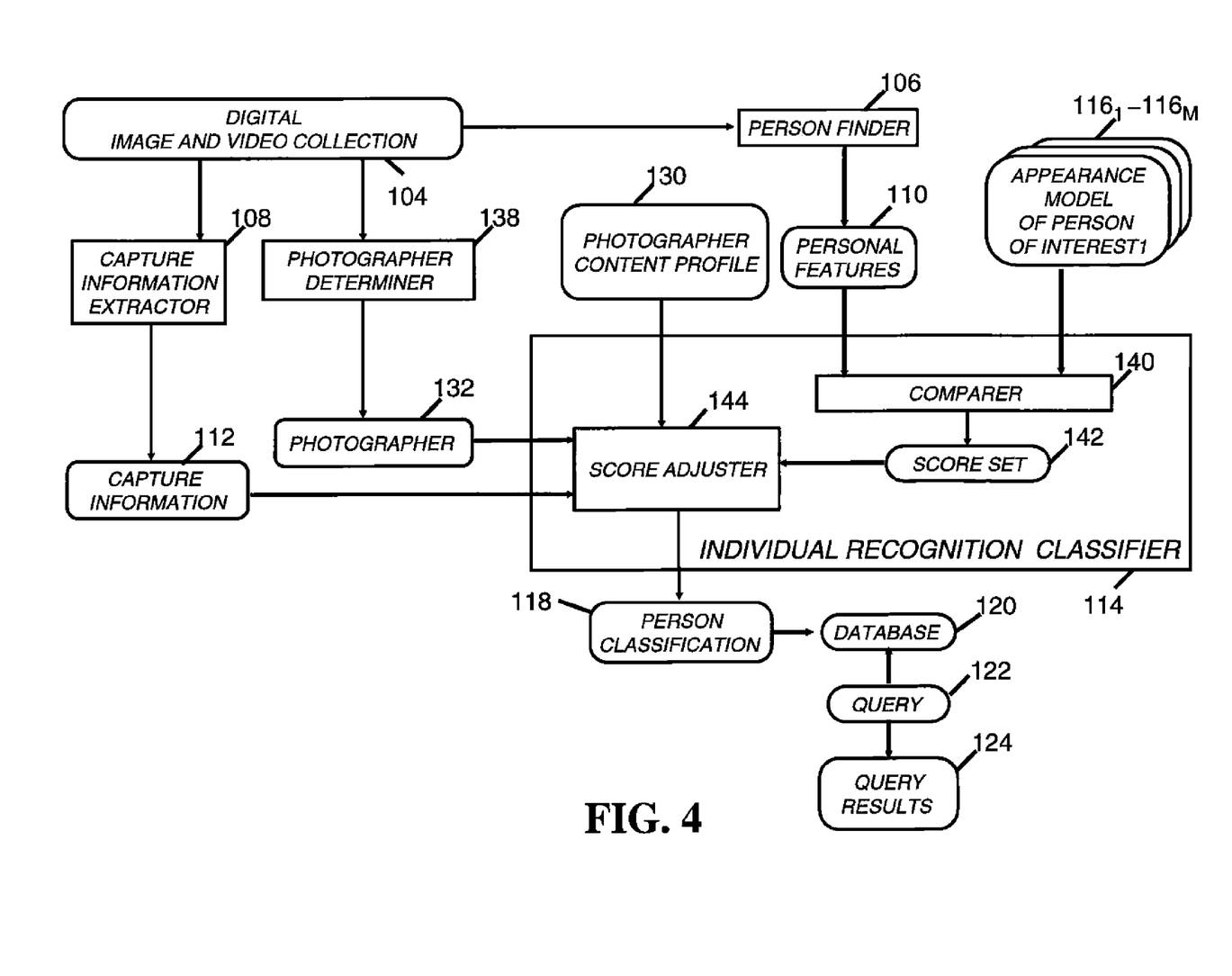
FIG. 4 is a more detailed flow chart of an embodiment of the present invention.

FIG. 4 shows a more detailed view of the individual recognition classifier 114. For each set of personal features 110 extracted by the person finder 106 a comparer 140 compares the personal features 110 with each of the M appearance models $116_{1-M}$ representing M individuals of interest and outputs a score set 142 of M scores indicating the likelihood or probability that the particular person found by the person finder is the $m^{th}$ person of interest. The comparer 140 can for example calculate a Euclidean distance between the personal features 110 and each of the M appearance models. Or the comparer 140 can compute a Mahalanobis distance from each of the M appearance models to produce the score set 142. Further, the comparer 140 can be any classifier, such as but not limited to, Gaussian Maximum Likelihood, a neural network, a support vector machine or the like. Preferably, the $m^{th}$ entry of the score set 142 indicates the probability that the particular face corresponding to the set of personal features 110 is the $m^{th}$ person of interest.

The score set 142 is passed to a score adjuster 144 for adjusting the score according to information related to the photographer 132 and the capture information 112, producing an adjusted score set. The score adjuster 144 considers the score set likelihoods or probabilities and refines the scores as follows. The scores in the score set 142 are adjusted according to the capture information 112. When the capture information 112 indicates that the self-timer flag was used to capture the digital image or video 104, then the score for the $m^{th}$ person of interest is increased if the $m^{th}$ person is the photographer 132 of the digital image or video 104. In this manner, the score adjuster 144 considers the prior probability (i.e. the prior probability of an event A is the probability that A occurs in the absence of any other data) of the photographer 132 appearing in the digital image or video 104 when the self-timer is user to capture the digital image or video 104. Likewise, when the capture information 112 indicated that the digital image or video 104 was captured using a remote signal to activate the camera's capture mechanism, the score for the $m^{th}$ person of interest is increased if the $m^{th}$ person is the photographer 132 of the digital image or video 104. The score adjuster 144 outputs a person classification 118 for the person detected by the person finder 106. The person classification 118 can be the score set 142 after the adjustment by the score adjuster 144. Or the person classification 118 can be the identity of the person of interest with the highest corresponding score in the adjusted score set, providing that that score is greater than a threshold T0.

Conceptually, to produce the person classification 118, the individual recognition classifier 114 preferably computes:

P(x=m|f), i.e. the probability that the person detected by the person finder 106 is person m, given the evidence of the personal features 110 f. By Bayes rule, This quantity can be computed for each of the m persons of interest by:

$$P(x=m|f)=P(f|x=m)P(x=m)/P(f)$$

The term P(f|x=m) is the probability of observation of the personal features f when it is known the person is the $m^{th}$ person of interest. This can be found by considering appearance model 116 for the $m^{th}$ person of interest which describes the variation in appearance for the $m^{th}$ person of interest. The term P(x=m) is the prior probability and is the probability that a person in an image or video is the person of interest m. The prior probability varies as a function of the identity of the photographer 132. For example, a wife and husband share a camera. Of the people appearing in images where the wife is the photographer, 60% are the baby, 20% are the husband, and 20% are others. When the husband is the photographer, 40% of the people appearing in photos are the baby, 20% are the wife, 5% are the husband, and 35% are others. Therefore, when the individual recognition classifier 114 knows the identity of the photographer 132, a photographer content profile 130 associated with that photographer 132 can be used by the score adjuster 144 to properly adjust the score set 142 in an appropriate fashion. In the preferred embodiment, the photographer content profile 130 contains the prior probabilities of persons of interest appearing in images and videos for a particular photographer. Preferably, the score set 142 contains the probabilities P(f|x=m) and the score adjuster 144 adjusts the scores by multiplicatively weighting with the prior probability P(x=m) specified in the photographer content profile 130.

The photographer content profiles 130 for a particular photographer are generated by having a user manually verify the identities of people in a set of images or videos captured by the particular photographer. Then the prior probabilities are computed and stored in the photographer content profile 130. The prior probabilities can consider the capture information 112. For example, a photographer 132 has one set of prior probabilities that describe the probability of a person being the $m^{th}$ person of interest when the self-timer function is on as indicated by the capture information 112, and a second set of prior probabilities with the self-timer function is off. For example, the following table gives the prior probabilities that a given person in an image or video is the $m^{th}$ person of interest for two different photographers and when the self-timer function is off and on.

| Mth Person of interest | Photographer is person of interest 0 | | Photographer is person of interest 1 | |
| --- | --- | --- | --- | --- |
| | Self-timer on | Self-timer off | Self-timer on | Self-timer off |
| 0 | 0.3 | 0.0 | 0.3 | 0.2 |
| 1 | 0.3 | 0.3 | 0.3 | 0.0 |
| 2 | 0.2 | 0.4 | 0.3 | 0.6 |
| unknown | 0.2 | 0.3 | 0.1 | 0.2 |

Therefore, the photographer 132 of the digital image or video 104 is identified along with capture information 112 related to the digital image or video 104. The photographer content profile 130 corresponding to the photographer 132 is used to determine the identities of persons in the digital image or video 104.

Figure 5:
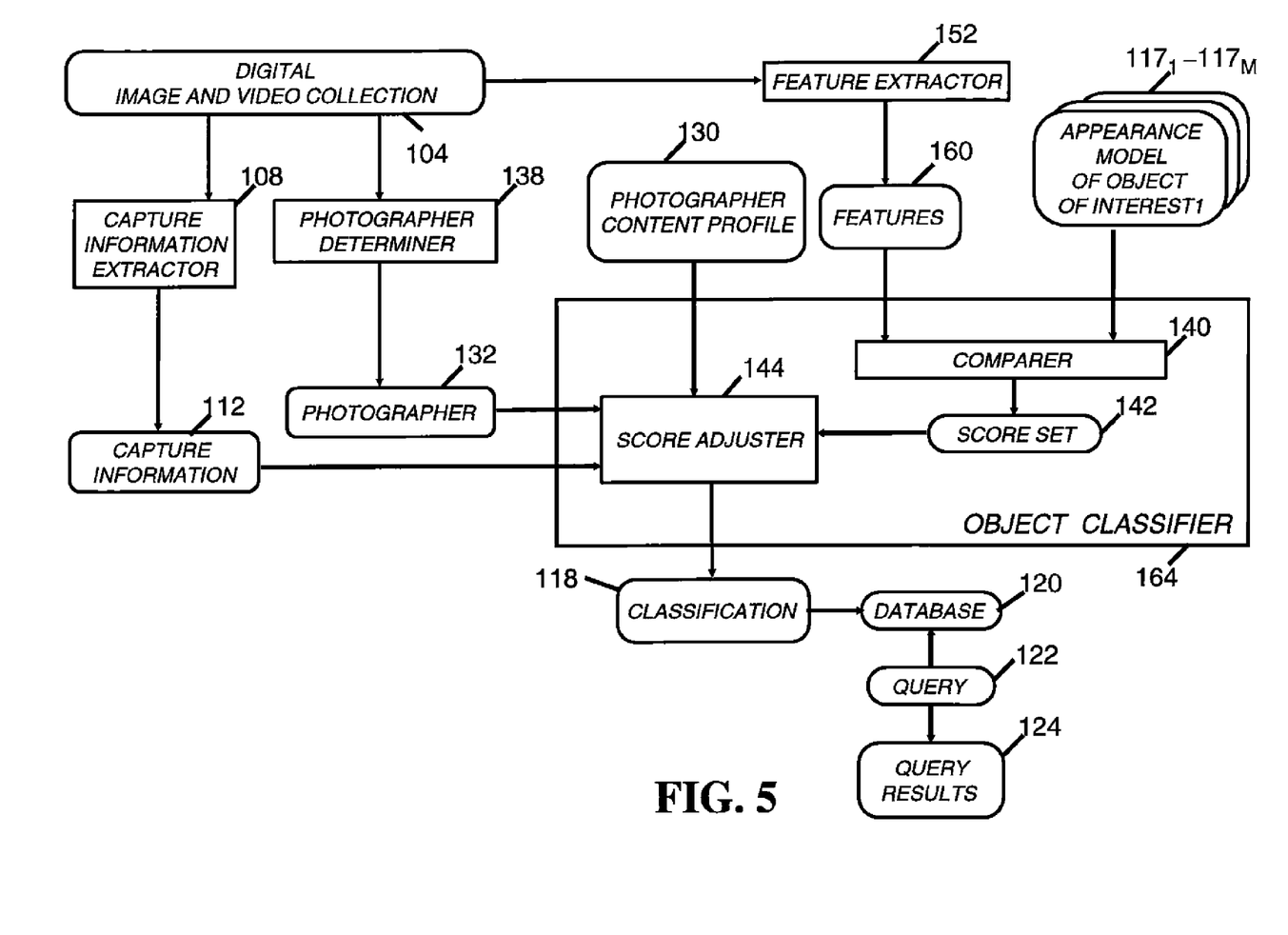
FIG. 5 is flow chart of an alternative embodiment of the present invention.

FIG. 5 shows an alternative embodiment for using the identify of the photographer 132 to identify objects within the digital image or video 104 or to classify the digital image or video itself. Digital images or videos 104 from a collection are passed to a feature extractor 152 for extracting features 160 that are passed to an object classifier 164.

Additionally, the appearance models for objects of interest 117$_{1-M}$ are passed to the object classifier. A comparer 140 compares the features 160 extracted from the images or videos with the appearance models of the objects of interest 117$_{1-M}$, producing the score set 142. Preferably, the score set 142 includes a probability that the features 160 relate to a particular object m of interest.

The identity of the photographer 132 and capture information 112 is passed to the score adjuster 144. The score adjuster 144 loads a photographer content profile 130 that describes the prior probability of the particular object m is in the image or video and adjusts the score set 142 accordingly to produce an adjusted score set, resulting in a classification 118 that is stored in a database 120, ready for querying as before. Alternatively, the photographer content profile 130 describes the prior probability that the image is an object of interest. The photographer content profile 130 associated with the photographer 132 describes the probability that the image represents the object of interest.

For example, the object classifier 164 can have the objective of determining whether an image is an "indoor" or "outdoor" image. However, different photographers capture different proportions of their images indoor versus outdoor. For example, photographer 0 captures 30% indoor images and 70% outdoor images but photographer 1 captures 30% indoor images and 70% outdoor images. This information is provided by the photographer content profile 130 corresponding to the identify of the photographer 132. Thus, knowledge of the prior probability for a particular photographer allows the score adjuster 144 to adequately consider the prior probability and improve the overall performance of the object classifier 164.

The object classifier 164 in this example classifies the state of the image as either an indoor or an outdoor image. Other object classifiers 164 can be used to determine whether an image is a natural scene or a manmade scene. Furthermore, an object classifier 164 can be used to determine if an image is a sunset image or not a sunset image.

The object classifier 164 can also be used to find specific objects within an image. For example, the individual recognition classifier 114 is an example of an object classifier used to recognize individual objects within a scene. In another embodiment, the object classifier 164 is used to detect the presence of a redeye defect (which may occur 0, 1 or many times in a single image). The object classifier 164 determines whether an image represents the object of interest.

Furthermore, the photographer content profile 130 can be dependent on the capture information 112 in addition to the identify of the photographer 132. For example, the following table is a photographer content profile 130 and shows the probability that a given image or video captured by a given photographer is "indoor" or "outdoor", as based on the month of the image capture that is contained in the capture information 112. In this case, "indoor" and "outdoor" are objects of interest that are described with an appearance model used by the object classifier 164 to classify an image as an indoor image or an outdoor image.

|  | Photographer 0 | | Photographer 1 | |
| --- | --- | --- | --- | --- |
|  | indoor | Outdoor | indoor | outdoor |
| Jan-March | 0.3 | 0.7 | 0.5 | 0.5 |
| April-June | 0.5 | 0.5 | 0.3 | 0.7 |
| July-Sept. | 0.6 | 0.4 | 0.2 | 0.8 |
| Oct.-Dec | 0.4 | 0.6 | 0.8 | 0.2 |

The photographer content profile 130 has been shown to include prior probability information for the classification of a single image or video. Additionally, the photographer content profile 130 can contain information related to the probability of a particular image (or video) being outdoors given that a previous image was outdoors for example. This information is stored as a state transition matrix as are commonly used in the study of Markov Chains and hidden Markov Models. The state transition matrices are dependent on the identification of the photographer, because they are related to the photographic behavior of that individual. For example, a state transition matrix for photographer 2:

| When | For photographer 2 Probability image or video n + 1 is | |
| --- | --- | --- |
| image n is: | indoor | Outdoor |
| indoor | 0.8 | 0.2 |
| outdoor | 0.3 | 0.7 |

The transition matrix is a special case of a prior probability. The transition matrix can depend on the capture information 112, for example the time interval between the image n and the image n+1. For example, if the time interval between the two images is large (e.g. 3 days), then the state transition matrix is:

| When | For photographer 2 Probability image or video n + 1 is | |
| --- | --- | --- |
| image n is: | indoor | Outdoor |
| indoor | 0.6 | 0.4 |
| outdoor | 0.43 | 0.57 |

Once the correction photographer content profile 130 is known, hidden Markov models can be used along with the state transition matrix to determine the state of the image (in this case, whether the image is indoor or outdoor.)

Figure 6A:
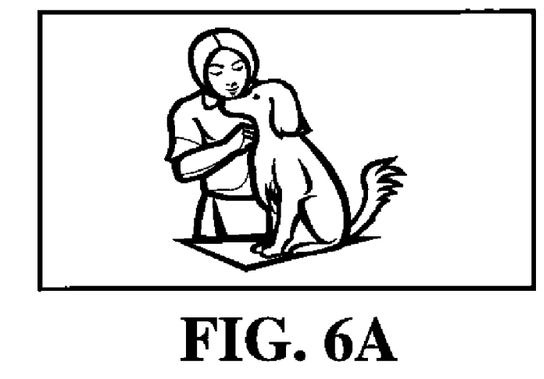
FIGS. 6A-6D illustrate four different image orientations.
Figure 6B:
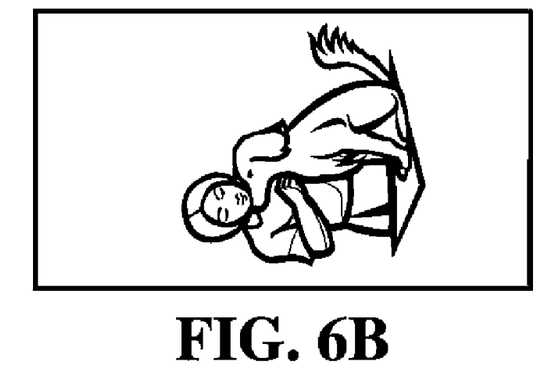
Figure 6C:
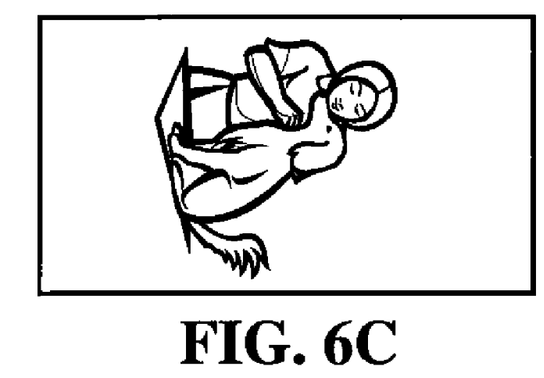
Figure 6D:
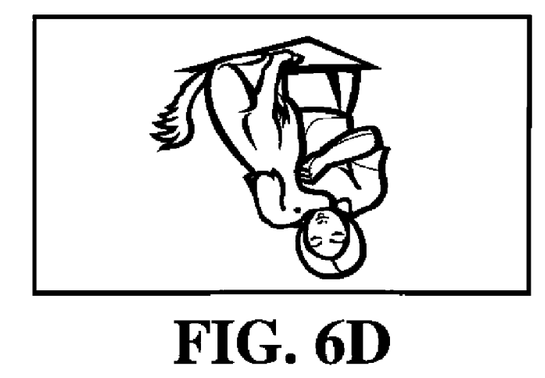

The capture information 112 and identify of the photographer 132 are used to select the correct photographer content profile 130 for inputting to the object classifier 164. In a further embodiment, knowing the identity of the photographer further enables a more accurate image orientation detection. In general, a rectangular image is properly viewed in one of four possible viewing orientations. Luo, in U.S. Patent Application Publication US 2003/0152289 A1 teaches a method to automatically determination which of these four orientations is correct for an image based on semantic object and scene layout detections and employing an arbitration method to estimate of image orientation. The prior probabilities of horizontal, vertical 1, vertical 2, and upside down horizontal are noted to be 70%-14%-14%-2%. FIG. 6A shows an example of an image in horizontal orientation. FIGS. 6B-6D show image having orientations of vertical 1, vertical 2, and upside down horizontal, respectively.

Generally, photographers capture landscape scenes in the horizontal orientation (i.e. photographers rarely hold the camera upside down when photographing a scene). However, for vertical or portrait scenes with an aspect ratio having larger height than width, there are two possible camera orientations. Most photographers take "vertical" photographs using only one of these positions. Knowing the photographer's identity establishes that photographer's individual behavior, thus improving its performance in determining image orientation.

An example orientation probability versus photographer matrix (the photographer probability profile 130 of FIG. 5) is shown below:

|  | Photographer 0 | Photographer 1 |
| --- | --- | --- |
| Horizontal | 0.850 | 0.650 |
| Upside Down | 0.005 | 0.010 |
| Vertical 1 | 0.125 | 0.030 |
| Vertical 2 | 0.020 | 0.310 |

Having improved image orientation determination performance improves the performance of subsequent image understanding algorithms that utilize a priori knowledge of orientation. Knowledge of other photographer specific capture traits (types of scenes, camera settings, typical location and time of capture) provides additional information that can improve the performance of subsequent image enhancement, image organization, and image management algorithms. For example, knowing if a photographer does not have a steady hand (resulting in excessive camera motion during image capture), could signal a subsequent image enhancement algorithm to more aggressively attempt to correct for image blur. Yet another example is if a particular photographer tends to not keep the camera level with the horizon, knowing the photographer identity could signal an image enhancement algorithm that levels the image.

The invention has been described in detail with particular reference to certain preferred embodiments thereof, but it will be understood that variations and modifications can be effected within the spirit and scope of the invention.

PARTS LIST 10 image capture devices
20 microprocessor-based unit (aka digital image processor)
30 image output device
40 general control computer
50 display device
60 keyboard
70 offline memory device
104 digital images or videos
106 person finder
108 information extractor
110 personal features
112 capture information
114 individual recognition classifier
116 appearance model of a person of interest
117 objects of interest
118 person classification
120 database
122 query or queried
124 query results
130 photographer content profile
132 photographer
138 photographer determiner
140 comparer
142 score set
144 score adjuster
160 features
164 object classifier

The invention claimed is:

1. A method of identifying at least one particular person of interest in a collection of digital images taken over time, comprising:
   providing the collection of digital images with each digital image containing one or more persons;
   storing in a digital database an appearance model having a set of features associated with the particular person of interest and a prior probability of the person of interest appearing in images by a particular photographer;
   comparing the appearance model with features extracted from the digital images in the collection of digital images and using the prior probability and the appearance model to determine if the particular person of interest is in one or more digital images in the collection of digital images and wherein the particular person of interest is the photographer; and
   providing image capture information relating to the camera settings used by the particular photographer to change the prior probability of the particular photographer being in the collection of digital images.

2. The method of claim 1 wherein the image capture information further includes the mode of the camera self-timer.

3. The method of claim 2 wherein the prior probability is increased when the person of interest is the photographer and the mode of the camera self-timer is on.

4. The method of claim 2 wherein the prior probability is decreased when the person of interest is the photographer and the mode of the camera self-timer is off.

5. The method of claim 2 wherein the prior probability is increased when the person of interest is other than the particular photographer.

* * * * *